(12) United States Patent
Soulie

(10) Patent No.: US 9,136,884 B2
(45) Date of Patent: Sep. 15, 2015

(54) COMMUNICATION NODE SUITABLE FOR RECEIVING AND/OR TRANSMITTING RADIO COMMUNICATIONS ACCORDING TO AT LEAST ONE FIRST AND ONE SECOND COMMUNICATIONS PROTOCOL SIMULTANEOUSLY

(75) Inventor: Antoine Soulie, Gennevilliers Cedex (FR)

(73) Assignee: THALES, Neuilly sur Seine (FR)

( * ) Notice: Subject to any disclaimer, the term of this patent is extended or adjusted under 35 U.S.C. 154(b) by 48 days.

(21) Appl. No.: 14/342,751

(22) PCT Filed: Sep. 4, 2012

(86) PCT No.: PCT/EP2012/067208
§ 371 (c)(1),
(2), (4) Date: Jul. 21, 2014

(87) PCT Pub. No.: WO2013/034542
PCT Pub. Date: Mar. 14, 2013

(65) Prior Publication Data
US 2014/0328420 A1    Nov. 6, 2014

(30) Foreign Application Priority Data

Sep. 5, 2011  (FR) ..................... 11 02689

(51) Int. Cl.
*H04B 1/18* (2006.01)
*H04B 1/00* (2006.01)
*H04B 1/04* (2006.01)

(52) U.S. Cl.
CPC ............... *H04B 1/006* (2013.01); *H04B 1/005* (2013.01); *H04B 1/04* (2013.01)

(58) Field of Classification Search
CPC ...................................... H04B 1/006
USPC ......................................... 455/188.2
See application file for complete search history.

(56) References Cited

U.S. PATENT DOCUMENTS 5,471,652 A   11/1995  Hulkko
6,185,202 B1 * 2/2001  Gockler et al. ............... 370/344
(Continued)

FOREIGN PATENT DOCUMENTS

EP     0581573 A1    2/1994
WO  2005/104389 A1   11/2005

OTHER PUBLICATIONS

International Search Report and Written Opinion, dated Nov. 22, 2012, which issued during the prosecution of International Patent Application No. PCT/EP2012/067208, which corresponds to the present application.

*Primary Examiner* — Sanh Phu
(74) *Attorney, Agent, or Firm* — Troutman Sanders LLP

(57) ABSTRACT

A communication node receiving and/or transmitting radio communications according to a first and a second communication protocol simultaneously. It has a first, second, respectively digital processing stage performing operations specific to the first, second protocol, respectively, operating in parallel. A first, second receiving stage, respectively, operating according to the first, second communication protocol, a transmission stage operating according to the first and second communication protocols, having a digital/analog converter converting a digital signal provided by the first or second digital processing stage into an analog signal, a modulator modulating said analog signal, an amplifier and a radiofrequency transmitter transmitting a radio frequency signal corresponding to the modulated analog signal, and a control module selecting, based on a rule and a detected event, the first or second communication protocol and commanding the transmission stage to operate selectively according to the selected protocol and no longer operate according to the non-selected protocol.

10 Claims, 3 Drawing Sheets

(56) References Cited

U.S. PATENT DOCUMENTS

| | | |
|---|---|---|
| 2005/0227631 A1 | 10/2005 | Robinett |
| 2007/0273792 A1* | 11/2007 | Monnier et al. ............ 348/572 |
| 2008/0205560 A1 | 8/2008 | Rofougaran |
| 2008/0274732 A1* | 11/2008 | Boutigny et al. ............ 455/427 |
| 2008/0281585 A1* | 11/2008 | Feher ............ 704/201 |
| 2011/0195705 A1 | 8/2011 | Gobien |

* cited by examiner

COMMUNICATION NODE SUITABLE FOR RECEIVING AND/OR TRANSMITTING RADIO COMMUNICATIONS ACCORDING TO AT LEAST ONE FIRST AND ONE SECOND COMMUNICATIONS PROTOCOL SIMULTANEOUSLY

CROSS-REFERENCE TO RELATED APPLICATIONS

The present application is a National Stage of International Application PCT/EP2012/067208 filed Sep. 4, 2012. This application published as WO 2013/034542 on Mar. 14, 2013. The PCT claims priority to French Application No. 1102689 filed Sep. 5, 2011. All of the above applications are herein incorporated by reference.

FIELD OF INVENTION

The present invention relates to a communication node suitable for receiving and/or transmitting radio communications according to at least one first communication protocol and one second communication protocol different from the first protocol.

BACKGROUND

In the radio nodes of the prior art, when the node must handle the communications relay of an additional network, the node is completed by a complete receiving, processing, transmission chain, according to the communication protocol implemented in that additional network. The multiplication of networks thus causes the multiplication of the volume occupied by the node, as well as increased electricity consumption of the node.

Techniques also exist whereby shared modules are used for the communication on different networks, by using software to reconfigure the modules each time the network for which they are used changes. However, the software reconfiguration is a slow process, which requires between 5 and 30 seconds to load/unload the software from the different components of the digital boards of the modem. Simultaneous communications on the different networks are therefore not guaranteed. Therefore, the volume of the node remains significant if the number of networks with which it is necessary to communicate at the same time is high.

SUMMARY

To that end, according to a first aspect, the invention relates to a telecommunications node of the aforementioned type, characterized in that it further comprises:

a control module suitable for detecting the occurrence of an event, for selecting as a function of a rule and of said detected event, the first communication protocol or the second communication protocol, and for commanding the transmission stage to operate selectively according to the selected protocol and to no longer operate according to the non-selected protocol.

The invention thus makes it possible to provide parallel communication capabilities on several networks using the same node, while complying with the power supply constraints and/or minimizing the volume of the nodes.

In examples, the communication node according to the invention further includes one or more of the following features that the control module is further suitable, following the selection of said protocol, for commanding the digital stage, among the first digital processing stage and the second digital processing stage, suitable for operating according to the non-selected communication protocol, to stop providing the digital signal to the transmission stage. The node is suitable for ordering the transmission by the transmission stage according to the non-selected communication protocol, before said transmission stage operates selectively according to the selected protocol, of a notification to stop transmission according to said non-selected communication protocol The event detected by the control module includes indicating a datum to be transmitted by the node, a synchronization request by one of the first and second digital processing stages and/or the absence of digital signal provided by one of the first and second digital processing stages The rule relates to at least one receiving node and/or one transmitting node, a priority order assigned to the communication data received by the node, and/or a synchronization constraint specific to the first and/or second digital processing stage.

The first and the second receiving stage, respectively, is suitable for operating alternately according to the first communication protocol and the second communication protocol, and wherein, when the control module commands the transmission stage to operate selectively according to the selected protocol and to no longer operate according to the non-selected protocol, said control module further commands the first receiving stage to operate selectively according to the selected protocol and to no longer operate according to the non-selected protocol, further commands the second receiving stage to operate selectively according to the non-selected protocol and to no longer operate according to the selected protocol, switches the first and second receiving stages to provide data intended for the first and second digital stages and the first and second digital processing stages each include at least one processor specific to them.

According to a second example, the invention relates to a processing method in a communication node suitable for receiving and/or transmitting radio communications according to at least one first communication protocol and one second communication protocol different from the first protocol, selectively, the node including a first digital processing stage suitable for performing operations specific to the first protocol on a digital signal and a second digital processing stage suitable for performing operations specific to the second protocol on a digital signal, said digital processing stages being suitable for working in parallel.

A first and a second receiving stage, respectively, suitable for operating according to the first, second communication protocol, respectively, and each comprising a radio frequency receiver suitable for receiving a radiofrequency signal, a demodulator suitable for demodulating the received radiofrequency signal and an analog/digital converter for converting the demodulated analog signal into a digital signal provided to the first, second digital processing stage, respectively. A transmission stage suitable for operating according to the first communication protocol and according to the second communication protocol, including a digital/analog converter to convert a digital signal provided by the first digital processing stage or the second digital processing stage into an analog signal, a modulator suitable for modulating said analog signal, an amplifier and a radiofrequency transmitter suitable for transmitting a radio frequency signal corresponding to the modulated analog signal. The method being characterized in that it has the following steps carried out by the node. The occurrence of an event is detected, and the first communication protocol or the second communication protocol is selected as a function of a rule and of said detected event; and the transmission stage is commanded to operate selectively according to the selected protocol and no longer operate according to the non-selected protocol.

BRIEF DESCRIPTION OF THE DRAWINGS

The invention will be better understood upon reading the following description and examining the accompanying figures. These figures are provided as an illustration, but are not limiting on the invention. These figures are as follows.

DETAILED DESCRIPTION

Figure 1:
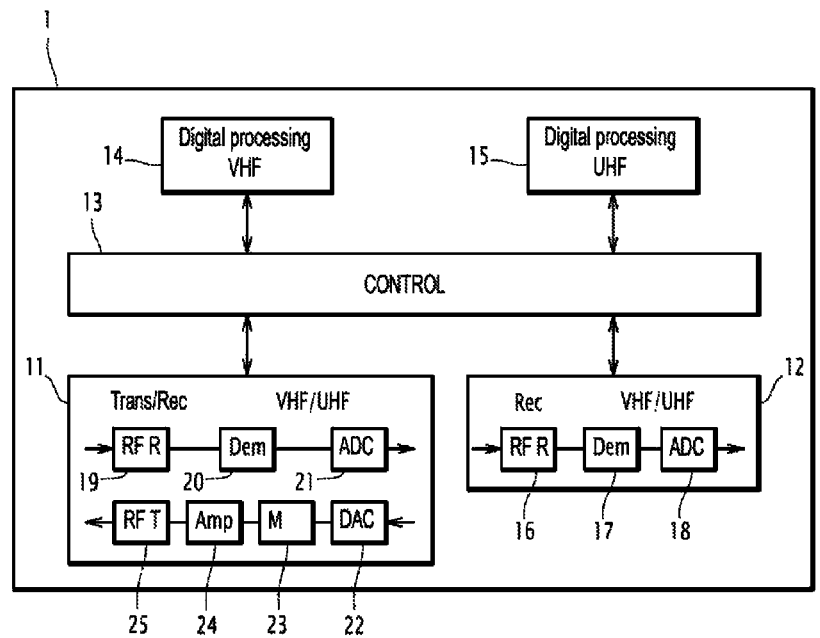
FIG. 1 is a view of a node in one example of the invention.

FIG. 1 shows an example of a radio node 1 in one example of the invention.

The radio node 1 is a radio set suitable for constituting a radio node of a UHF telecommunications network and a VHF telecommunications network.

The radio node 1 includes a VHF/UHF transceiver module 11, a VHF/UHF receiver module 12, a control module 13, a VHF digital processing module 14 and a UHF digital processing module 15.

The control module is suitable for controlling the operation of the VHF/UHF transceiver module 11, the VHF/UHF receiver module 12, the VHF digital processing module 14 and the UHF digital processing module 15.

The VHF/UHF transceiver module 11 and the VHF/UHF receiver module 12 are suitable for each operating in the VHF (Very High Frequency) radiofrequency range (30 MHz to 300 MHz), or in the UHF (Ultra High Frequency) radiofrequency range (300 MHz to 3000 MHz), based on a respective command provided by the control module 13 indicating the VHF or UHF operating mode.

The receiver module 12 has a radio frequency receiver 16, suitable for receiving a radiofrequency signal indicating telecommunications data sent to the node 1 on a predetermined UHF or VHF radio receiving channel determined based on a command from the control module 13, a demodulator 17 suitable for the modulating such a radiofrequency signal and optionally applying filtering, an analog/digital converter 18 for converting the demodulated signal into digital data representative of the telecommunications data sent to the node 1.

The node 1 is further suitable for this digital data to be routed, under the control of the control module 13, toward the suitable VHF 14, UHF 15 digital processing module, respectively, depending on whether the receiver module 12 was operating in VHF, UHF mode, respectively, to deliver that digital data.

The VHF/UHF transceiver module 11 also includes a radiofrequency receiver 19, suitable for receiving a radiofrequency signal indicating telecommunications data sent to the node 1 on a predetermined UHF or VHF radio receiving channel determined based on a command from the control module 13, a demodulator 20 suitable for demodulating such a radiofrequency signal and optionally applying filtering, an analog/digital converter 21 for converting the demodulated signal into digital data representative of the telecommunications data.

The node 1 is further suitable for this digital data to then be routed under the control of the control module 13 toward the suitable VHF 14, UHF 15 digital processing module, respectively, depending on whether the receiver module 12 was operating in VHF, UHF mode, respectively, to deliver that digital data.

The VHF/UHF transceiver module 11 further includes a digital/analog converter 22 suitable for receiving digital data delivered by the VHF 14, UHF 15 digital processing module, respectively, according to the control of the control module 13, depending on whether the transceiver module 11 is operating in VHF, UHF mode, respectively, a modulator 23, a power amplifier 24 and a radiofrequency transmitter 25. The digital/analog converter 22 converts the received digital data into analog data and provides it to the modulator 23, which modulates the analog data using a signal at a VHF or UHF modulation frequency, depending on the frequency range commanded by the control module 13, before delivering it to the power amplifier 24, which, after having performed the power amplification (of approximately 20-30 dB) thereon, transmits the amplified signal to the radiofrequency transmitter 25. The latter then transmits the amplified radiofrequency signal.

The VHF 14, UHF 15 digital processing module, respectively, for example includes a digital board equipped with a microprocessor and suitable for performing processing operations specific to the VHF, UHF communication, respectively, to analyze the digital data transmitted to it as input from the receiver module 12 to the transceiver module 11, depending on the control by the control module 13, and/or applying error correction codes, and/or regenerating data, identifying the node transmitting some of that data, requesting retransmissions of data from transmitting nodes, generating signal channel requests intended for at least one other node, etc.

Thus, the radio node 1 does not have a simultaneous UHF/VHF transmission capability, since it only uses one transmission resource, operating alternately, and not simultaneously, in UHF and VHF.

According to the invention, the control module 13 is suitable for making a real-time determination of which digital processing module from among the VHF 14 and UHF 15 digital processing modules is selected to provide digital data for radiofrequency transmission to the transceiver module 11.

In the case ("VHF transmission" case) where the control module 13 determines that it is the VHF digital processing module 14 that has been selected to provide digital data for radiofrequency transmission to the transceiver module 11, then the control module 13 simultaneously:

commands the transceiver module 11 to operate in the VHF range, commands the receiver module 12 to operate in a complementary manner in the UHF range, commands the connections between the digital processing modules 14, 15 and the transceiver modules 11, 12, for example by controlling the switches, such that:

the VHF module 14 is notified that it can provide digital data to be transmitted (end of "radio silence" mode) to the transceiver module 11 for radiofrequency transmission via the successive processing operations done by the digital/analog converter 22, the modulator 23, the amplifier 24 and radiofrequency transmitter 25;

the VHF data received by the receiver 19 from the transceiver 11, after being demodulated by the demodulator 20 and digitized by the analog/digital converter 21, are provided to the VHF digital processing module 14;

the UHF data received by the receiver 16 after being demodulated by the demodulator 17 and digitized by the analog/digital converter 18 are provided to the UHF digital processing module 15;

commands the UHF digital processing module 15 to stop the supply by that module of data to be transmitted ("radio silence" mode, also called "transmission standby").

Figure 2:
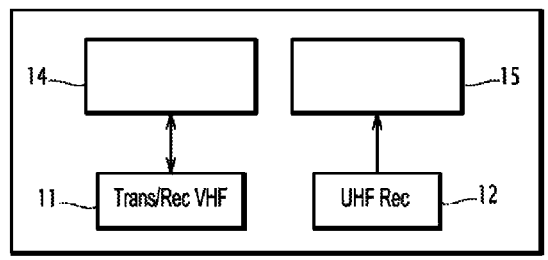
FIG. 2 illustrates a first operating configuration of the node 1.

The configuration corresponding to this "VHF transmission" case is illustrated in FIG. 2.

In the case ("UHF transmission" case) where the control module 13 determines that it is the UHF digital processing module 15 that has been selected to provide digital data for radiofrequency transmission to the transceiver module 11, then the control module 13 simultaneously:

commands the transceiver module 11 to operate in the UHF range, commands the receiver module 12 to operate in a complementary manner in the VHF range, commands the connections between the digital processing modules 14, 15 and the transceiver modules 11, 12, for example by controlling switches, such that:

the UHF module 15 is notified that it can provide digital data to be transmitted (end of "radio silence" mode) and the digital data processed by the UHF module 15 are provided to the transceiver module 11 for radiofrequency transmission via the successive processing operations done by the digital/analog converter 22, the modulator 23, the amplifier 24 and the radiofrequency transmitter 25;

the UHF data received by the receiver 19 from the transceiver 11, after being demodulated by the demodulator 20 and digitized by the analog/digital converter 21, are provided to the UHF digital processing module 15;

the VHF data received by the receiver 16, after being demodulated by the demodulator 17 and digitized by the analog/digital converter 18, are provided to the VHF digital processing module 14;

commands the VHF digital processing module 14 to stop the supply by that module of data to be transmitted ("radio silence" or "transmission standby" mode).

Figure 3:
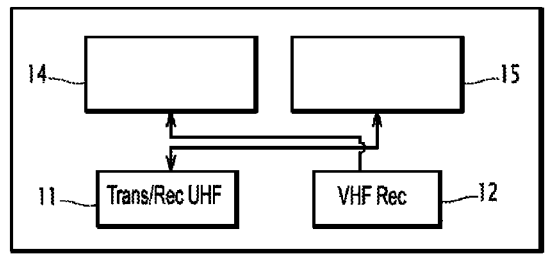
FIG. 3 illustrates a second operating configuration of the node 1.

The configuration corresponding to this "UHF transmission" case is illustrated in FIG. 3.

The operation for determining the case among the "VHF transmission" and "UHF transmission" cases is done each time a predetermined event(s) is (are) detected by the control module 13.

Such an event may be of various natures: for example, the passing of a given time delay and/or the identification of data to be transmitted by the node 1 by either of the VHF 14, UHF 15 digital processing modules and/or a notification of the VHF 14, UHF 15 digital processing module, respectively, according to which a synchronization operation must be done with at least one other node on the VHF, UHF network, respectively, and/or a notification indicating an absence of data to be transmitted provided by one and/or the other of the VHF 14, UHF 15 digital processing modules, etc.

In one example, the passage of the node 1 into "radio silence" mode in UHF, VHF, respectively, is indicated to the neighboring nodes by the UHF, VHF transmission, respectively, of the corresponding notification by the transceiver module 11 before the passage into the "radio silence" mode of the UHF processing module 15 and before the passage into the VHF mode of the transceiver module ("VHF transmission" case), respectively before passage into the "radio silence" mode of the VHF processing module 14 and before the passage into the UHF mode of the transceiver module 11 ("UHF transmission" case).

The nodes of the UHF, VHF network, respectively, affected by this radio silence are thus notified that their transmissions to the node 1 will not be acknowledged immediately by the latter, and may adapt their transmission mode so as to reliabilize it.

In another example, the control module 13 does not command the digital processing module to which the receiver module 12 provides digital data to go into "radio silence" mode, for example when that configuration is provided to be short-lasting.

The determination of the case from among the "VHF transmission" and "UHF transmission" cases is done by the control module 13 based on a rule or several combined rules. A rule for example depends on one or more receiver(s)/transmitter(s) of data to be transmitted and/or data received by the node, and/or priorities assigned to the data and/or constraints related to the UHF and/or VHF synchronization.

Figure 4:
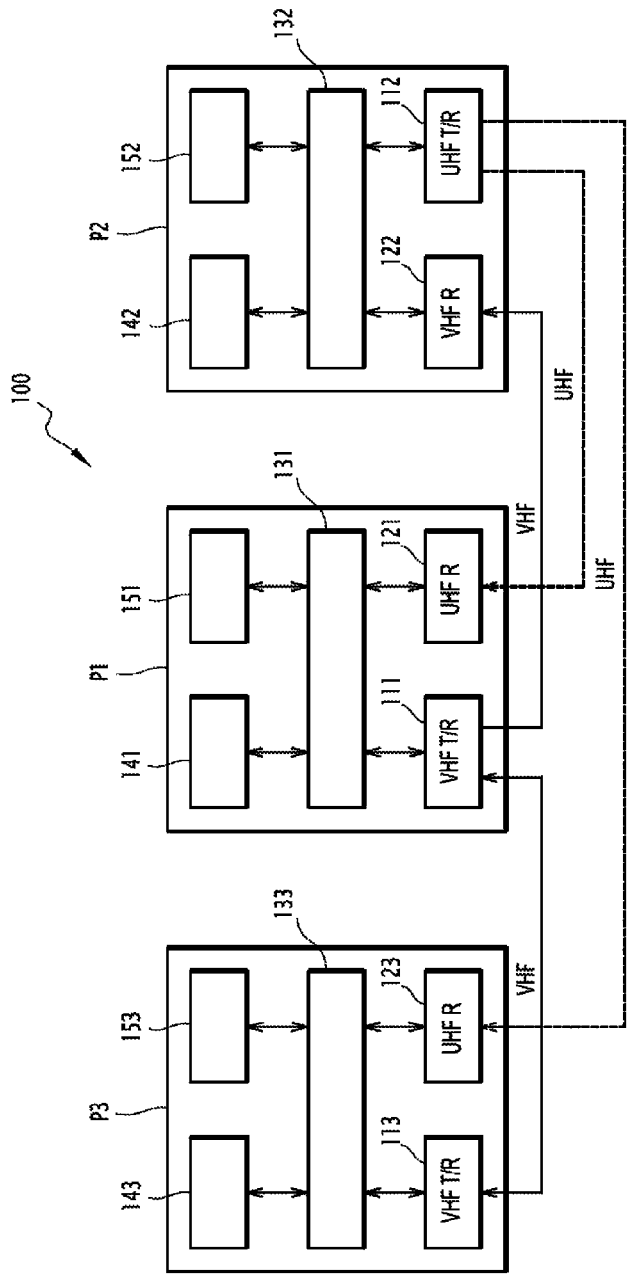
FIG. 4 is a view of a communication system including three nodes in one example of the invention.

FIG. 4 shows a system 100 including three nodes P1, P2, P3 each similar to the node 1 and within radio range of each other.

Each piece of equipment referenced N in FIG. 1, for N=11 to 15 in reference to the node 1, corresponds to the equipment referenced Ni of the node Pi, for i=1 to 3, in FIG. 4.

This FIG. 4 illustrates the possibilities of "full-duplex" communication, with these three nodes P1 to P3 being single-channel in transmission, and dual-channel in reception.

In the considered configuration:

in node P1, the transceiver module 111 is operating in VHF, and the receiver module 121 is operating in UHF;

in node P2, the transceiver module 112 is operating in UHF, and the receiver module 122 is operating in VHF;

in node P3, the transceiver module 113 is operating in VHF, and the receiver module 123 is operating in UHF.

The sets P1 and P2 can thus communicate together in "full-duplex" mode on the different radio channels for communication in one direction (in UHF) and communication in the other direction (in VHF); at the same time that the sets P1 and P3 are communicating with each other in transceiver mode in VHF. The set P2 can transmit in UHF at the same time to P3, which can receive those data transmitted by P2.

As illustrated in FIG. 4, the nodes remain in two-way communication in two ways:

either via the same frequency range in both directions of communication: for example, in the nodes P1 and P3, which communicate in VHF, or via one frequency range in one direction, and another in the other direction: for example, the node P1 transmits toward the node P2 in VHF, and receives from the node P2 in UHF.

When the connectivity in a node is broken in UHF, which has a more limited range than VHF:

the simple receiver module makes it possible to continue to listen to messages and conferences in VHF;

if a communication must be established in VHF, then the node switches its UHF and VHF channels;

it remains in simple UHF reception (i.e., "radio silence" mode) with the nearby nodes and can give them orders via the VHF, since the latter are in simple VHF listening.

When UHF connectivity returns, the information is known owing to the simple UHF reception of the node, which detects the presence of a node that was out of range until then;

the node returns to UHF transceiver and simple VHF receiver mode.

Figure 5:
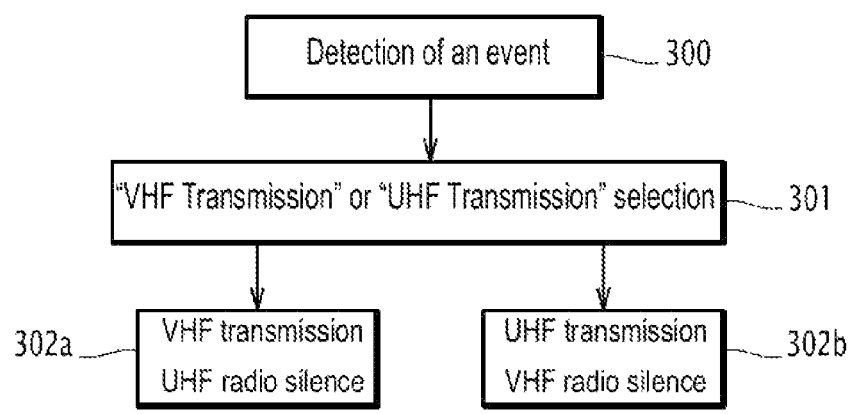
FIG. 5 is a flowchart of a method in one example of the invention.

FIG. 5 shows a flowchart of the steps of a method implemented in a radio node in one example of the invention.

In a step 300, the occurrence of an event is detected, in the manner described above.

Based on this event and at least one rule, the "VHF transmission" case or the "UHF transmission" case is selected, in a step 301, in the manner described above.

The commands corresponding to the selected case are then carried out by the control module 13 (step 302a or 302b).

The invention thus makes it possible to miniaturize the radio node by decreasing the number of transmission resources, owing to the pooling of those resources between different telecommunications networks.

The radio node remains listening on all of the radio channels, and can transmit on all of the radio channels quasi-instantaneously owing to the quasi-immediate switching capability between the transmission modules and the digital processing modules (there are no delays due to software loading/unloading).

According to the invention, digital switching between the two UHF, VHF wave forms is done, in the transmission processing, before data to be transmitted are provided to the digital/analog converter 22, and the analog/digital conversion 22, modulator 23, amplifier 24, radiofrequency transmitter 25 modules are used in common for UHF transmission or VHF transmission.

In the example described in reference to the figures, a transceiver hardware module and a simple receiver hardware module have been considered. The invention may nevertheless be implemented when one transmission module and two receiver modules independent of the transmission module are considered. In that case, there is no need to invert the receiver modules when the communication protocol implemented by the transmission module changes.

In another example, the invention is for example carried out based on two transceiver hardware modules (in place of one transceiver hardware module and one simple receiver hardware module), the transmission functionality of one of the two modules not being used in order to comply with power supply constraints. The use of the transmission functionality may in one usage mode be done alternately on each of the transceiver hardware modules. There is then no need to invert the transceiver modules for them to provide/receive data with respect to the digital processing modules.

In reference to the figures, a node has been considered relaying the communications of two networks. Of course, the invention can be implemented in the case of a node relaying the communications of any number n of networks, n being able to be strictly greater than 2, and the invention making it possible to share the transmission capabilities between several networks, inasmuch as the transmission capability can be used alternately for both networks. The node then includes n radiofrequency stages, some of which have a transmission and reception capability and others a reception capability only. Only the radiofrequency transmission stages require a synonymous consumption and volume power amplifier. A control module commands the connections between the radiofrequency (and if applicable, receiver) transmission stages and the digital processing module specific to each network.

One network has been considered based on communications of the UHF type, and another on communications of the VHF type. Of course, the invention may be implemented with varied types of communication protocols, as long as a shared transmission device can be used. For example, the protocols of the pooled transmission networks could be the 2G and 3G technologies. It may also be implemented with digital processing modules working in the same frequency range but on different frequency channels (for example, two modules working in VHF can, under the proposed method, pool the transmission module).

The invention claimed is:

1. A communication node receiving and/or transmitting radio communications according to at least one first communication protocol and one second communication protocol different from the first protocol, comprising:
a first digital processing stage performing operations specific to the first protocol on a digital signal and a second digital processing stage performing operations specific to the second protocol on a digital signal, said digital processing stages operating in parallel,
a first receiving stage operating according to the first communication protocol,
a second receiving stage operating according to the second communication protocol,
the first, second, respectively, receiving stage comprising a radio frequency receiver receiving a radiofrequency signal, a demodulator demodulating the radiofrequency signal received and an analog/digital converter converting the demodulated analog signal into a digital signal provided to the first, second digital processing stage, respectively,
a transmission stage operating according to the first communication protocol and according to the second communication protocol, comprising a digital/analog converter converting a digital signal provided by the first digital processing stage or the second digital processing stage into an analog signal, a modulator modulating said analog signal, an amplifier and a radiofrequency transmitter transmitting a radio frequency signal corresponding to the modulated analog signal,
wherein said node further includes a control module detecting the occurrence of an event, selecting as a function of a rule and of said detected event, the first communication protocol or the second communication protocol, and commanding the transmission stage to operate selectively according to the selected protocol and to no longer operate according to the non-selected protocol.

2. The communication node according to claim 1, wherein the control module can, following the selection of said protocol, commanding the digital stage, among the first digital processing stage and the second digital processing stage operating according to the non-selected communication protocol, to stop providing the digital signal to the transmission stage.

3. The communication node according to claim 1, ordering the transmission by the transmission stage according to the non-selected communication protocol, before said transmission stage operates selectively according to the selected protocol, of a notification to stop transmission according to said non-selected communication protocol.

4. The communication node according to claim 1, wherein the event detected by the control module comprises indicating a datum to be transmitted by the node, a synchronization request by one of the first and second digital processing stages and/or the absence of digital signal provided by one of the first and second digital processing stages.

5. The communication node according to claim 1, wherein the rule relates to at least one receiving node and/or one transmitting node, a priority order assigned to the communication data received by the node, and/or a synchronization constraint specific to the first and/or second digital processing stage.

6. The communication node (1) according to claim 1, wherein the first, second receiving stage, respectively, operate alternately according to the first communication protocol and the second communication protocol, and wherein, when the control module commands the transmission stage to operate selectively according to the selected protocol and to no longer operate according to the non-selected protocol, said control module:
- further commands the first receiving stage to operate selectively according to the selected protocol and to no longer operate according to the non-selected protocol,
- further commands the second receiving stage to operate selectively according to the non-selected protocol and to no longer operate according to the selected protocol,
- switches the first and second receiving stages to provide data intended for the first and second digital stages.

7. The communication node according to claim 1, wherein the first and second digital processing stages each include at least one processor specific to them.

8. A processing method in a communication node receiving and/or transmitting radio communications according to at least one first communication protocol and one second communication protocol different from the first protocol, selectively, the node comprising:
- a first digital processing stage performing operations specific to the first protocol on a digital signal and a second digital processing stage performing operations specific to the second protocol on a digital signal, said digital processing stages working in parallel,
- a first, second receiving stage, respectively, operating according to the first, second communication protocol, respectively, and each comprising a radio frequency receiver receiving a radiofrequency signal, a demodulator demodulating the received radiofrequency signal and an analog/digital converter converting the demodulated analog signal into a digital signal provided to the first, second digital processing stage, respectively,
- a transmission stage operating according to the first communication protocol and according to the second communication protocol, comprising a digital/analog converter to convert a digital signal provided by the first digital processing stage or the second digital processing stage into an analog signal, a modulator modulating said analog signal, an amplifier and a radiofrequency transmitter transmitting a radio frequency signal corresponding to the modulated analog signal, the method comprises the following steps carried out by the node:
- detecting the occurrence of an event, and selecting the first communication protocol or the second communication protocol as a function of a rule and of said detected event; and
- commanding the transmission stage to operate selectively according to the selected protocol and no longer operate according to the non-selected protocol.

9. The processing method according to claim 8, wherein the detected event comprises the indication of a datum to be transmitted by the node, a synchronization request by one of the first and second digital processing stages and/or the absence of digital signal provided by one of the first and second digital processing stages.

10. The processing method according to claim 8, wherein the rule relates to at least one receiving node and/or one transmitting node, a priority order assigned to the communication data received by the node, and/or a synchronization constraint specific to the first and/or second digital processing stage.

* * * * *